(12) United States Patent
Wu et al.

(10) Patent No.: US 9,904,064 B2
(45) Date of Patent: Feb. 27, 2018

(54) DOUBLE-VISION-DEVICE ALIGNMENT DEVICE AND DOUBLE-VISION-DEVICE ALIGNMENT METHOD

(71) Applicant: BOE TECHNOLOGY GROUP CO., LTD., Beijing (CN)

(72) Inventors: Naifu Wu, Beijing (CN); Wei Wei, Beijing (CN); Chia Chiang Lin, Beijing (CN); Tao Wang, Beijing (CN); Chunmiao Zhou, Beijing (CN); Kun Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 276 days.

(21) Appl. No.: 14/761,830

(22) PCT Filed: Dec. 17, 2014

(86) PCT No.: PCT/CN2014/094024
§ 371 (c)(1),
(2) Date: Jul. 17, 2015

(87) PCT Pub. No.: WO2016/004734
PCT Pub. Date: Jan. 14, 2016

(65) Prior Publication Data
US 2016/0252737 A1    Sep. 1, 2016

(30) Foreign Application Priority Data
Jul. 7, 2014   (CN) .......................... 2014 1 0319881

(51) Int. Cl.
*G02B 27/22* (2006.01)
*H04N 13/00* (2018.01)
(Continued)

(52) U.S. Cl.
CPC .......... *G02B 27/2214* (2013.01); *G01J 3/463* (2013.01); *G02B 7/003* (2013.01);
(Continued)

(58) Field of Classification Search
CPC .... G02B 27/2214; G02B 27/22; G02B 7/003; G01J 3/463; H04N 13/00; H04N 13/0425; G02F 1/1333
See application file for complete search history.

(56) References Cited

U.S. PATENT DOCUMENTS

2009/0273662 A1* 11/2009 Lucente ............. G02B 27/2214
348/43
2011/0255018 A1* 10/2011 Roh ....................... G02B 27/26
349/15
(Continued)

FOREIGN PATENT DOCUMENTS

CN   101109895 A   1/2008
CN   101375198 A   2/2009
(Continued)

OTHER PUBLICATIONS

Machine translation of CN 102540533 A, Kunhong Du, Jul. 2012.*
(Continued)

*Primary Examiner* — Bumsuk Won
*Assistant Examiner* — Balram Parbadia
(74) *Attorney, Agent, or Firm* — Ladas & Parry LLP

(57) ABSTRACT

A double-vision-device alignment device and a double-vision-device alignment method are provided. The double-vision-device alignment device is configured to accurately align a display panel with a double-vision device, and comprising: a first chromaticity detecting unit, configured to detect a color in a first viewing region; a second chromaticity detecting unit, configured to detect a color in a second viewing region, wherein the first viewing region and the
(Continued)

second viewing region are formed by light splitting of the double-vision device, and the first viewing region and the second viewing region correspond to different display regions of the display panel, respectively. It is judged whether an alignment is accurate by detection of a chromaticity detecting unit, which can prevent an alignment result from being affected by human factors, improve accuracy and efficiency, and reduce labor intensity, and the device can be operated by non-professionals.

12 Claims, 1 Drawing Sheet

(51) Int. Cl.
*G01J 3/46* (2006.01)
*G02B 7/00* (2006.01)
*G02F 1/13* (2006.01)
*H04N 13/04* (2006.01)

(52) U.S. Cl.
CPC .......... *G02B 27/22* (2013.01); *G02F 1/1303* (2013.01); *H04N 13/00* (2013.01); *H04N 13/0409* (2013.01)

(56) References Cited

U.S. PATENT DOCUMENTS

| | | |
|---|---|---|
| 2012/0218258 A1 | 8/2012 | Mashitani |
| 2013/0176525 A1* | 7/2013 | Liao .................. G02B 27/2214 349/191 |
| 2014/0043600 A1 | 2/2014 | Wu |
| 2014/0043680 A1 | 2/2014 | Uehara et al. |

FOREIGN PATENT DOCUMENTS

| | | |
|---|---|---|
| CN | 102540533 A | 7/2012 |
| CN | 102627016 A | 8/2012 |
| CN | 102662242 A | 9/2012 |
| CN | 103575507 A | 2/2014 |
| CN | 103676247 A | 3/2014 |
| CN | 104112416 A | 10/2014 |
| EP | 0763755 A2 | 3/1997 |
| JP | 2001-285896 A | 10/2001 |
| JP | 2013-187655 A | 9/2013 |
| WO | 2007070721 A2 | 6/2007 |

OTHER PUBLICATIONS

International Search Report Appln. No. PCT/CN2014/094024; dated Apr. 13, 2015.

Written Opinion of the International Searching Authority Appln. No. PCT/CN20141094024; dated Apr. 13, 2015.

Second Chinese Office Action dated May 27, 2016; Appln. No. 201410319881.2.

Third Chinese Office Action dated Sep. 23, 2016; Appln. No. 201410319881.3.

Fourth Chinese Office Action dated Jan. 20, 2017; Appln. No. 201410319881.3.

First Chinese office Action Appln. No. 201410319881.3; dated Jan. 29, 2016.

* cited by examiner

DOUBLE-VISION-DEVICE ALIGNMENT DEVICE AND DOUBLE-VISION-DEVICE ALIGNMENT METHOD

TECHNICAL FIELD

Embodiments of the invention relate to a double-vision-device alignment device and a double-vision-device alignment method

BACKGROUND

"Double-vision display" refers to a display technology that different images displayed on one display screen can be seen at different positions at the same time, and if a distance between two positions is equal to a pitch of human eyes, it is just a "naked-eye 3D display".

As shown in FIG. 1, an existing double-vision display device comprises a display panel 5 and a light splitting device, i.e., a double-vision device, arranged on a light exiting side of the display panel 5. The display panel 5 displays a two-dimensional image, and is divided into a plurality of first display regions 51 and second display regions 52 arranged alternately. Here, a "parallax barrier 91" is taken as a specific example of a double-vision device to illustrate. It can be seen from the diagrams that, the parallax barrier 91 comprises light shielding strips and light transmitting strips arranged alternately; by the parallax barrier 91, a viewer positioned in a first viewing region 81 on a left side of the display panel 5 only can see a part of the display panel 5 (i.e., the first display regions 51), while a viewer positioned in a second viewing region 82 on a right side of the display panel 5 only can see the other part of the display panel 5 (i.e., the second display regions 52), and a viewer in a crosstalk region 83 can see both of the first display regions 51 and the second display regions at a same time. In this way, as long as the first display regions 51 and the second display regions 52 display different images respectively, the different images can be seen in the first viewing region 81 and the second viewing region 82, respectively, thus achieving a double-vision display. Here, if a distance between the first viewing region 81 and the second viewing region 82 is equal to a pitch of human eyes, and a stereoscopic image pair having parallax is displayed in the first display regions 51 and the second display regions 52 respectively, then a left-eye image and a right-eye image having parallax can be seen by left and right eyes respectively, to achieve a naked-eye 3D display. Because the 3D display also belongs to a double-vision display, it will not be separately described hereinafter.

The double-vision device is to make light emitted from different positions (different display regions) of the display panel irradiate to different regions (different viewing regions), which has various forms, and besides the parallax barrier described above, the double-vision device may also be a lenticular lens.

However, no matter what kind of double-vision-device it is, the double-vision-device and the display panel must satisfy a specific positional relationship (i.e., an "alignment" must be performed) in order to achieve the double-vision display. If the alignment is not accurate, light from some display regions will enter other viewing regions (e.g., the light from the second display regions enter the first viewing region), there will be "crosstalk" in this viewing region, affecting a display effect. The alignment of an existing double-vision-device often employs a "red-green-image" method, i.e., two kinds of display regions of the display panel display red and green respectively, and then the double-vision device is gradually moved and viewers respectively positioned in the two viewing regions view the image; when pure red and pure green images are observed in the two viewing regions respectively, it proves an accurate alignment of the double-vision device, thus, the double-vision device may be fixed on the display panel (e.g., adhered to the display panel with adhesive).

However, the above alignment method depends on human eyes to observe and judge whether an alignment is accurate, so it is greatly affected by human factors, has poor accuracy, higher labor intensity, and low efficiency, and can be only implemented by specially-trained technical personnel.

SUMMARY OF THE INVENTION

Embodiments of the present invention provide a double-vision-device alignment device and a double-vision-device alignment method, which can improve alignment accuracy, reduce labor intensity, and improve alignment efficiency.

An embodiment of the present invention provides a double-vision-device alignment device, configured to accurately align a display panel with a double-vision device, and comprising: a first chromaticity detecting unit, configured to detect a color in a first viewing region; a second chromaticity detecting unit, configured to detect a color in a second viewing region, wherein the first viewing region and the second viewing region are formed by light splitting of the double-vision device, and the first viewing region and the second viewing region correspond to different display regions of the display panel, respectively.

An embodiment of the present invention further provides a double-vision device alignment method, for accurately aligning a display panel with a double-vision device, wherein the display panel comprises a plurality of first display regions and second display regions arranged alternately, comprising: placing a first chromaticity detecting unit in a first viewing region, and placing a second chromaticity detecting unit in a second viewing region; enabling the display panel to display a detection image, to display different colors in the first display regions and the second display regions; adjusting a relative position of the double-vision device and the display panel; when detection results of the first chromaticity detecting unit and the second chromaticity detecting unit are same as colors displayed in the first display regions and the second display regions respectively, stopping adjusting the double-vision device, and fixing the double-vision device on the display panel, wherein the first viewing region and the second viewing region correspond to the first display regions and the second display regions, respectively.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

Figure 1:
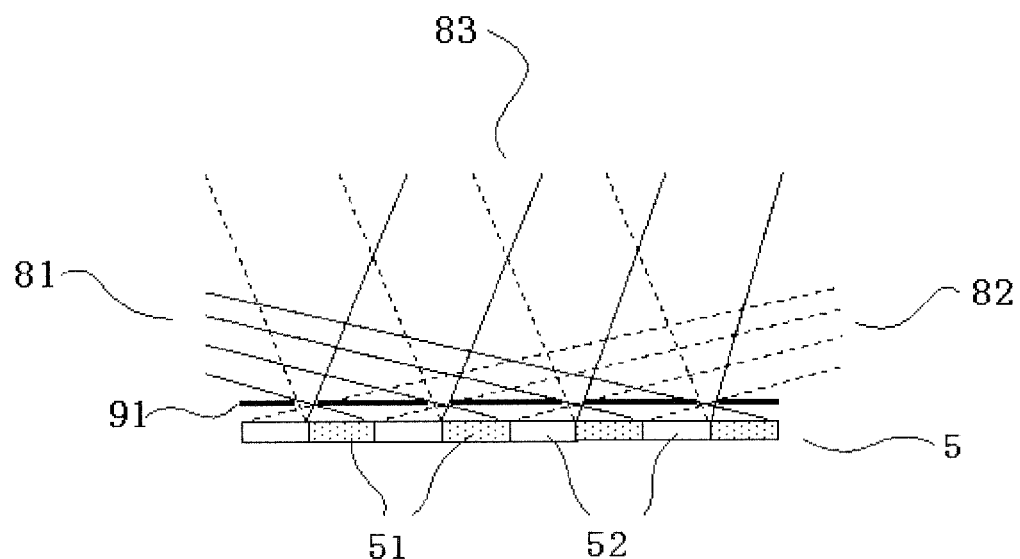
FIG. 1 is a structural schematic diagram of an existing double-vision display device.
Figure 2:
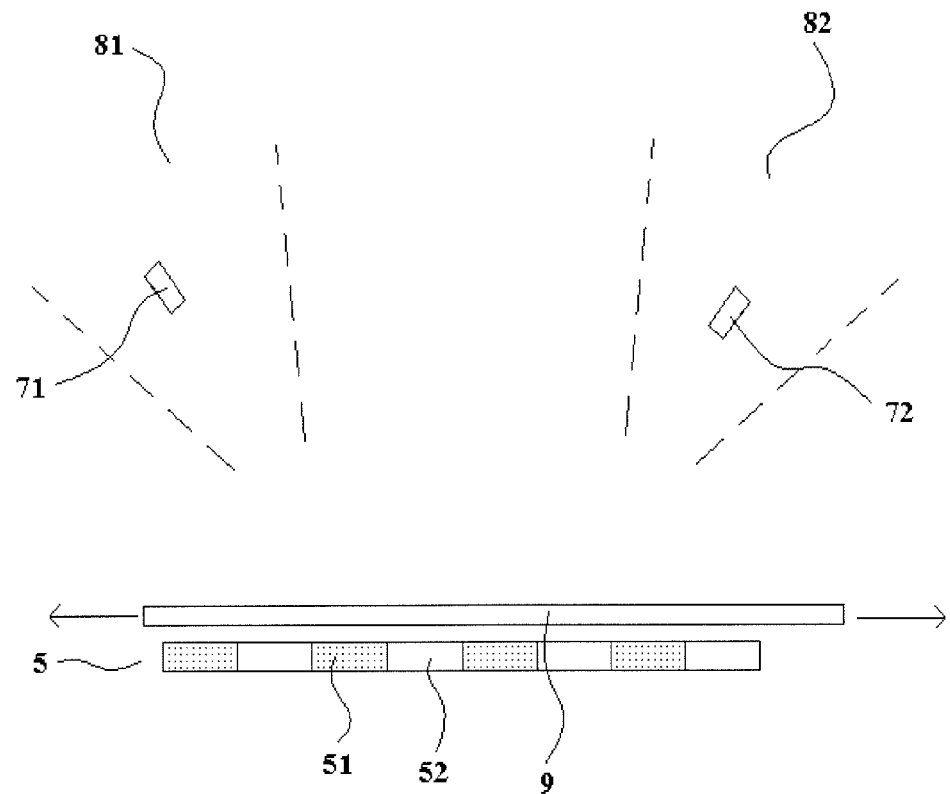
FIG. 2 is a principle schematic diagram of a double-vision-device alignment method according to an embodiment of the present invention.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In order to make those skilled in the art better understand technical solutions of the embodiments of the invention, the embodiments of the invention will be described in detail in connection with the drawings.

Embodiments of the present invention provide a double-vision-device alignment device and a double-vision-device alignment method.

Here, the alignment device and an alignment method for the alignment device can accurately align a double-vision device 9 with a display panel 5, that is to say, the double-vision device 9 can be fixed at a correct position on the display panel 5.

The display panel 5 is any display panel which can display a two-dimensional image, and is divided into a plurality of first display regions 51 and second display regions 52, each of the display regions is strip-shaped, and the two kinds of display regions are arranged alternately; exemplarily, the display panel 5 may be a liquid crystal display panel or an organic light emitting diode display panel.

The double-vision device 9 is configured to make light emitted from different positions (different display regions) of the display panel irradiate to different regions (different viewing regions), after split by the double-vision device 9, the light emitted from the first display regions 51 and the second display regions 52 will respectively irradiate to the first viewing region 81 and the second viewing region 82, that is, the first display regions 51 and the second display regions 52 correspond to the first viewing region 81 and the second viewing region 82, respectively. Exemplarily, the double-vision device 9 may be a parallax barrier or a lenticular lens.

For example, the double-vision device 9 may include a glass substrate, that is, on the whole, the double-vision device 9 is plate-shaped, and the double-vision device 9 is fixed at a correct position on the display panel 5, that is, a correct alignment between the double-vision device 9 and the display panel 5 can achieve a double-vision display.

Exemplarily, a double-vision-device alignment device according to an embodiment of the present invention comprises:

A first chromaticity detecting unit 71, configured to detect a color in a first viewing region 81;

A second chromaticity detecting unit 72, configured to detect a color in a second viewing region 82.

Herein, "a chromaticity detecting unit" refers to a device for detecting a "color" and "intensity" of light, for example, a colorimeter, a color sensor or the like.

During aligning, the two kinds of display regions of the display panel 5 may display different colors, respectively, and then the double-vision device 9 is moved with respect to the display panel 5. During moving, colors of light irradiated to the two viewing regions continuously change, which is detected by the two chromaticity detecting units at any time; if the colors of light detected by the two chromaticity detecting units at a certain time are the colors displayed in the two display regions, respectively, it indicates that, the light emitted from the first display regions 51 just enter the first viewing region 81, while the light emitted from the second display regions 52 just enter the second viewing region 82, so the alignment is accurate.

Exemplarily, the intensity of light may be detected while the two chromaticity detecting units detect the light irradiated into the first viewing region and the second viewing region. When the color of light is a color displayed in a display region corresponding to the viewing region, and the intensity reaches a preset value, it can be regarded as an accurate alignment between the double-vision device and the display panel.

The double-vision-device alignment device of the embodiment comprises two chromaticity detecting units, so it can be detected whether an alignment is accurate according to detection results of the chromaticity detecting units, which can avoid human influence, improve the accuracy and efficiency, and reduce labor intensity; and the device may be operated by non-professionals.

Exemplarily, the double-vision-device alignment device in the embodiment further comprises a reporting unit, which is configured to issue a report when both detection results of the first chromaticity detecting unit 71 and the second chromaticity detecting unit 72 are predetermined values.

In other words, a reporting unit may be provided, which is connected with the first chromaticity detecting unit 71 and the second chromaticity detecting unit 72, and may issue a report (e.g., emit light, emit sound, etc.) when both detection results of the first chromaticity detecting unit 71 and the second chromaticity detecting unit 72 are predetermined values (i.e., the alignment is accurate) to inform the operator to stop moving the double-vision device 9.

Exemplarily, the double-vision-device alignment device in the embodiment further comprises a panel fixing unit, for fixing the display panel 5.

For example, the panel fixing unit may be in various forms, such as a supporting plate (e.g., the supporting plate may be a horizontal plate arranged on a horizontal plane, and the display panel 5 is perpendicular to the supporting plate and fixed on the supporting plate, that is, the display panel 5 is transversely placed thereon), a supporting frame, a slot, a suction cup (e.g., the suction cup is fixed on a lower side of the display panel and suctioned on the desktop) and so on, which is used for fixing the display panel 5 at a required position, to facilitate moving the double-vision device 9 with respect to the display panel 5.

Exemplarily, the double-vision-device alignment device in the embodiment further comprises: a double-vision-device adjusting unit, for supporting the double-vision device 9 and adjust the position thereof.

During aligning, a relative position between the display panel 5 and the double-vision device 9 needs to be adjusted; if the display panel 5 is moved, the viewing region thereof will be moved accordingly, and the chromaticity detecting unit will be moved too, which is very inconvenient. Exemplarily, the display panel 5 may be fixed while a position of the double-vision device 9 may be adjusted. Therefore, a double-vision-device adjusting unit may be provided, for gradually adjusting the position of the double-vision device 9, for example, the double-vision-device adjusting unit may be in various forms, such as a supporting frame, a slot, a suction cup and so on.

Exemplarily, the double-vision-device alignment device in the embodiment further comprises a driving unit and a controlling unit. The driving unit is used for driving the double-vision-device adjusting unit, to move the double-vision device 9, for example, the driving unit may be in various forms such as a motor, an oil cylinder, an air cylinder and so on; and the controlling unit is used for controlling the driving unit according to detection results of the first chromaticity detecting unit 71 and the second chromaticity detecting unit 72.

In other words, if the double-vision device 9 is controlled by a machine to move rather than manually driven, the controlling unit may be provided, for adjusting movement (e.g., stop, move along a direction, etc.) of the double-vision device 9 according to detection results of the two chromaticity detecting units, and thus the alignment accuracy is further improved.

Exemplarily, the double-vision-device alignment device in the embodiment further comprises: a chromaticity detection adjusting unit, configured to support the first chromaticity detecting unit 71 and the second chromaticity detecting unit 72 and adjust positions and directions thereof.

For different types of display panel 5, positions of the two viewing regions thereof are different too, so a corresponding chromaticity detecting unit should also be arranged at different positions; meanwhile, one viewing region of one display panel 5 may have a certain range, and the chromaticity detecting unit only detect chromaticity of one point therein, in order to ensure accuracy of a detection result, the chromaticity detecting unit should also be moved in this viewing region. In addition, a detecting head of the chromaticity detecting unit should directly face light emitted from the display panel 5, to achieve a best detection effect, so an orientation of the detecting head thereof also needs to be adjusted. To this end, a chromaticity detecting adjusting unit may be provided, for adjusting positions and directions of the two chromaticity detecting units. Exemplarily, the chromaticity detection adjusting unit may include a supporting frame, a supporting bar and the like for supporting the chromaticity detecting unit, and may be adjusted manually, or may be driven by a motor, an oil cylinder, an air cylinder and so on.

Obviously, specific structures of the above panel fixing unit, double-vision-device adjusting unit, driving unit, and chromaticity detection adjusting unit are varied, and may by in any form known to the inventor, which is not limited by embodiments of the present invention.

Exemplarily, a double-vision-device alignment method for use in a double-vision-device alignment device in an embodiment further comprises:

S101: placing a first chromaticity detecting unit 71 in a first viewing region 81, and placing a second chromaticity detecting unit 72 in a second viewing region 82.

That is, the display panel 5 is fixed, for example, the display panel 5 is arranged on the panel fixing unit, and the two chromaticity detecting units are arranged in the two viewing regions respectively, for example, arranged on the chromaticity detection adjusting unit, to facilitate detection.

Exemplarily, viewing regions of the display panel 5 may be acquired by a simulation using a computer, for example, by entering parameters of the double-vision device, i.e., a light splitting device, and parameters of a display panel, position and range of a viewing region may be calculated, and thus the two chromaticity detecting units are arranged in two viewing regions respectively.

S102: enabling the display panel 5 to display a detection image, and different colors being displayed in the first display regions 51 and the second display regions 52.

Exemplarily, the display panel 5 is made to display a detection image (e.g., "red-green image") in a process of regular alignment, that is, the two display regions display images in difference colors, respectively.

Exemplarily, the two display regions may display a red image and a green image, respectively; the two colors are quite different, and are easy to be distinguished by the chromaticity detecting unit.

S103: adjusting a relative position of the double-vision device 9 and the display panel 5.

Exemplarily, the double-vision-device 9 is made to continuously move with respect to the display panel 5; for example, the double-vision device 9 is arranged on the double-vision-device adjusting unit, and driven by the driving unit to move, so an alignment position therebetween is continuously changed, and accordingly, the colors detected by the two chromaticity detecting units also continuously change.

S104: when detection results of the first chromaticity detecting unit 71 and the second chromaticity detecting unit 72 are same as colors displayed in the first display regions 51 and the second display regions 52 respectively, stopping adjusting the double-vision device 9, and fixing the double-vision device 9 on the display panel 5.

Exemplarily, when the double-vision device 9 is moved to a correct position (i.e., the alignment is accurate), the two chromaticity detecting units will detect pure red and pure green respectively, and then it is time to stop adjusting the double-vision device 9, and fix it on the display panel 5.

Exemplarily, the double-vision device 9 and/or the display panel 5 may be pre-coated with adhesive, and when the alignment is accurate, the two may contact with each other, and then the adhesive at several points is cured (pre-cured) by UV-light, the double-vision device 9 and the display panel 5 primarily connected will be reheated in an oven, to make the adhesive completely cured, thereby obtaining a double-vision display device. Of course, specific methods of fixing the double-vision device 9 on the display panel 5 are varied, which are not described in detail herein.

In the double-vision-device alignment device and double-vision-device alignment method according to embodiments of the present invention, it is detected whether an alignment is accurate according to detection results of the chromaticity detecting units, which can prevent the alignment result from being affected by human factors, improve the accuracy and efficiency, and reduce labor intensity; and the device can be operated by non-professionals.

It can be understood that, the foregoing implementation modes merely are exemplary implementation modes for explaining the principles of the present invention, but the invention is not limited thereto. One person ordinarily skilled in the art can make various changes or modifications to the present invention without departing from the spirit and scope of the invention, and such changes and modifications are also deemed as the protection scope of the present invention.

The present application claims priority of Chinese Patent Application No. 201410319881.3 filed on Jul. 7, 2014, the disclosure of which is incorporated herein by reference in its entirety as part of the present application.

What is claimed is:

1. A double-vision-device alignment device, configured to accurately align a display panel with a double-vision device, and comprising:
   a first chromaticity detecting unit, configured to detect a color in a first viewing region;
   a second chromaticity detecting unit, configured to detect a color in a second viewing region,
   wherein the first viewing region and the second viewing region are formed by light splitting of the double-vision device, and the first viewing region and the second viewing region correspond to different display regions of the display panel, respectively, a reporting unit, configured to issue a report when both detection results of the first chromaticity detecting unit and the second chromaticity detecting unit reach predetermined values, and the detection results that reach the predetermined values indicates that a color of light detected by the first chromaticity detecting unit is a color displayed in a display region corresponding to the first viewing region, a color of light detected by the second chromaticity detecting unit is a color displayed in a display region corresponding to the second viewing region, and the intensity of the lights respectively detected by the first chromaticity detecting unit and the second chromaticity detecting unit reaches the preset value.

2. The double-vision-device alignment device according to claim 1, further comprising:

a panel fixing unit, configured to fix the display panel.

3. The double-vision-device alignment device according to claim 2, wherein the panel fixing unit is a supporting plate, the supporting plate is a horizontal plate, and the display panel is perpendicular to the supporting plate and fixed on the panel fixing unit.

4. The double-vision-device alignment device according to claim 1, further comprising:

a chromaticity detection adjusting unit, configured to support the first chromaticity detecting unit and the second chromaticity detecting unit and adjust positions and directions of the first chromaticity detecting unit and the second chromaticity detecting unit.

5. The double-vision-device alignment device according to claim 1, further comprising:

a double-vision-device adjusting unit, configured to support the double-vision device and adjust a position of the double-vision device.

6. The double-vision-device alignment device according to claim 5, further comprising:

a driving unit, configured to drive the double-vision-device adjusting unit, to make the double-vision device move; and a controlling unit, configured to control the driving unit according to the detection results of the first chromaticity detecting unit and the second chromaticity detecting unit.

7. The double-vision-device alignment device according to claim 5, wherein the double-vision-device adjusting unit is a supporting plate, the supporting plate is a horizontal plate, and the double-vision device is perpendicular to the supporting plate and fixed on the double-vision-device adjusting unit.

8. The double-vision-device alignment device according to claim 1, wherein the first chromaticity detecting unit and the second chromaticity detecting unit are configured to detect color and intensity of light.

9. A double-vision-device alignment method, for accurately aligning a display panel with a double-vision device, wherein the display panel comprises a plurality of first display regions and second display regions arranged alternately, comprising:

placing a first chromaticity detecting unit in a first viewing region, and placing a second chromaticity detecting unit in a second viewing region;

enabling the display panel to display a detection image, to display different colors in the first display regions and the second display regions;

adjusting a relative position of the double-vision device and the display panel;

when detection results of the first chromaticity detecting unit and the second chromaticity detecting unit are same as colors displayed in the first display regions and the second display regions respectively and the intensity of the lights respectively detected by the first chromaticity detecting unit and the second chromaticity detecting unit reaches the preset value, stopping adjusting the double-vision device, and fixing the double-vision device on the display panel, wherein the first viewing region and the second viewing region correspond to the first display regions and the second display regions, respectively.

10. The double-vision-device alignment method according to claim 9, wherein, when the display panel displays the detection image, the first display regions and the second display regions display a red/green image and a green/red image, respectively.

11. The double-vision-device alignment method according to claim 9, wherein the display panel is a liquid crystal display panel or an organic light emitting diode display panel.

12. The double-vision-device alignment method according to claim 9, wherein the double-vision device is a parallax barrier or a lenticular lens.

* * * * *